United States Patent
Sato et al.

(10) Patent No.: US 7,152,497 B2
(45) Date of Patent: Dec. 26, 2006

(54) METHOD AND APPARATUS FOR SHIFTING A BICYCLE TRANSMISSION BY MULTIPLE STEPS

(75) Inventors: Hisayuki Sato, Sakai (JP); Kenji Ose, Sakai (JP); Satoshi Shahana, Osaka (JP); Toshio Tetsuka, Sakai (JP); Tetsuya Hino, Shimonoscki (JP)

(73) Assignee: Shimano, Inc., Sakai (JP)

( * ) Notice: Subject to any disclaimer, the term of this patent is extended or adjusted under 35 U.S.C. 154(b) by 138 days.

(21) Appl. No.: 10/353,190

(22) Filed: Jan. 27, 2003

(65) Prior Publication Data

US 2004/0144193 A1    Jul. 29, 2004

(51) Int. Cl.
   *F16C 1/10* (2006.01)
(52) U.S. Cl. .................................... 74/502.2
(58) Field of Classification Search .............. 74/489, 74/502.2, 473.13, 473.14
   See application file for complete search history.

(56) References Cited

U.S. PATENT DOCUMENTS

| | | | |
|---|---|---|---|
| 3,972,247 A | 8/1976 | Armstrong | |
| 5,012,692 A | 5/1991 | Nagano | |
| 5,044,213 A | 9/1991 | Nagano | |
| 5,203,213 A | 4/1993 | Nagano | |
| 5,241,878 A | 9/1993 | Nagano | |
| 5,257,683 A | 11/1993 | Romano | |
| 5,400,675 A | 3/1995 | Nagano | |
| 5,479,776 A | 1/1996 | Romano | |
| 5,660,083 A * | 8/1997 | Huang et al. | 74/502.2 |
| 5,676,022 A | 10/1997 | Ose | |
| 5,730,030 A | 3/1998 | Masui | |
| 5,806,372 A * | 9/1998 | Campagnolo | 74/473.14 |
| 5,829,313 A * | 11/1998 | Shahana | 74/502.2 |
| 5,862,709 A * | 1/1999 | Kageyama | 74/489 |
| 5,921,138 A * | 7/1999 | Kojima et al. | 74/473.13 |
| 5,957,002 A * | 9/1999 | Ueng | 74/502.2 |
| 6,450,060 B1 * | 9/2002 | Shahana | 74/502.2 |
| 6,502,477 B1 | 1/2003 | Assel | |
| 6,725,740 B1 * | 4/2004 | Dal Pra' | 74/502.2 |
| 2002/0124679 A1 | 9/2002 | Dal Pra | |

FOREIGN PATENT DOCUMENTS

| | | |
|---|---|---|
| DE | 3136922 A1 | 3/1983 |
| DE | 100 55 403 A1 | 5/2002 |
| EP | 790176 A1 | 8/1997 |
| EP | 1134158 A2 | 9/2001 |
| EP | 1232940 A2 | 8/2002 |
| EP | 1245483 A2 | 10/2002 |

* cited by examiner

*Primary Examiner*—Vicky A. Johnson
(74) *Attorney, Agent, or Firm*—James A. Deland

(57) ABSTRACT

A position release mechanism for a bicycle control device comprises a positioning unit that is adapted to be biased in a first direction; a position maintaining mechanism that maintains the positioning unit in a plurality of predetermined positions; and a position releasing mechanism that moves in a position releasing direction, wherein the position releasing mechanism is operatively coupled to the position maintaining mechanism so that the positioning unit moves through at least two of the plurality of predetermined positions in the first direction in response to a progressive movement of the position releasing mechanism in the position releasing direction.

43 Claims, 13 Drawing Sheets

METHOD AND APPARATUS FOR SHIFTING A BICYCLE TRANSMISSION BY MULTIPLE STEPS

BACKGROUND OF THE INVENTION

The present invention is directed to bicycles and, more particularly, to various features of a shift control device for a bicycle transmission.

Conventional shift control devices for bicycle transmissions typically include a lever or twist grip that is rotated in two directions. One rotational direction is used to upshift the bicycle transmission, and the other rotational direction is used to downshift the bicycle transmission. The bicycle transmission moves by an amount proportional to the movement of the shift control device in either direction.

More advanced shift control devices use ratchet and pawl mechanisms and two levers to control a wire winding member that controls the bicycle transmission. An example of such a shift control device is shown in U.S. Pat. No. 5,400,675. More specifically, a downshift lever is used to operate the wire winding member in a downshifting direction, and an upshift lever is used to operate the wire winding member in an upshifting direction. Pushing the downshift lever from a home position to a downshift position moves the wire winding member in a downshifting direction by a proportional amount until a downshift ratchet and pawl mechanism maintains the wire winding member in the newly selected position, which may correspond to up to speed steps. As a result, moving the downshift lever from the downshift position back to the home position does not have any effect on the position of the wire winding member (except for play in the components). Pushing the upshift lever from a home position to an upshift position moves the wire winding member in an upshifting direction (opposite the downshifting direction) through a two-stage process. In the first stage, the upshift lever is pushed from the home position to the upshift position, and the wire winding member moves in the upshifting direction by an amount determined by the releasing action of an upshift ratchet and pawl mechanism. In the second stage, the upshift lever is allowed to move from the upshift position back to the home position. In this case, the upshift ratchet and pawl mechanism allows the wire winding member to move the remaining amount required by the upshifting operation and thereafter stops the rotation of the wire winding member to complete the shift. However, only one speed step change may be achieved with such a construction.

In any event, known dual-lever shift control devices have the ability to operate the bicycle transmission through multiple speed steps in either the upshifting direction or the downshifting direction using a single operation of one of the levers. However, such an operation is not possible for both levers.

SUMMARY OF THE INVENTION

The present invention is directed to various inventive features of a bicycle shift control device. In one embodiment, a position release mechanism for a bicycle control device comprises a positioning unit that is adapted to be biased in a first direction; a position maintaining mechanism that maintains the positioning unit in a plurality of predetermined positions; and a position releasing mechanism that moves in a position releasing direction, wherein the position releasing mechanism is operatively coupled to the position maintaining mechanism so that the positioning unit moves through at least two of the plurality of predetermined positions in the first direction in response to a progressive movement of the position releasing mechanism in the position releasing direction.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
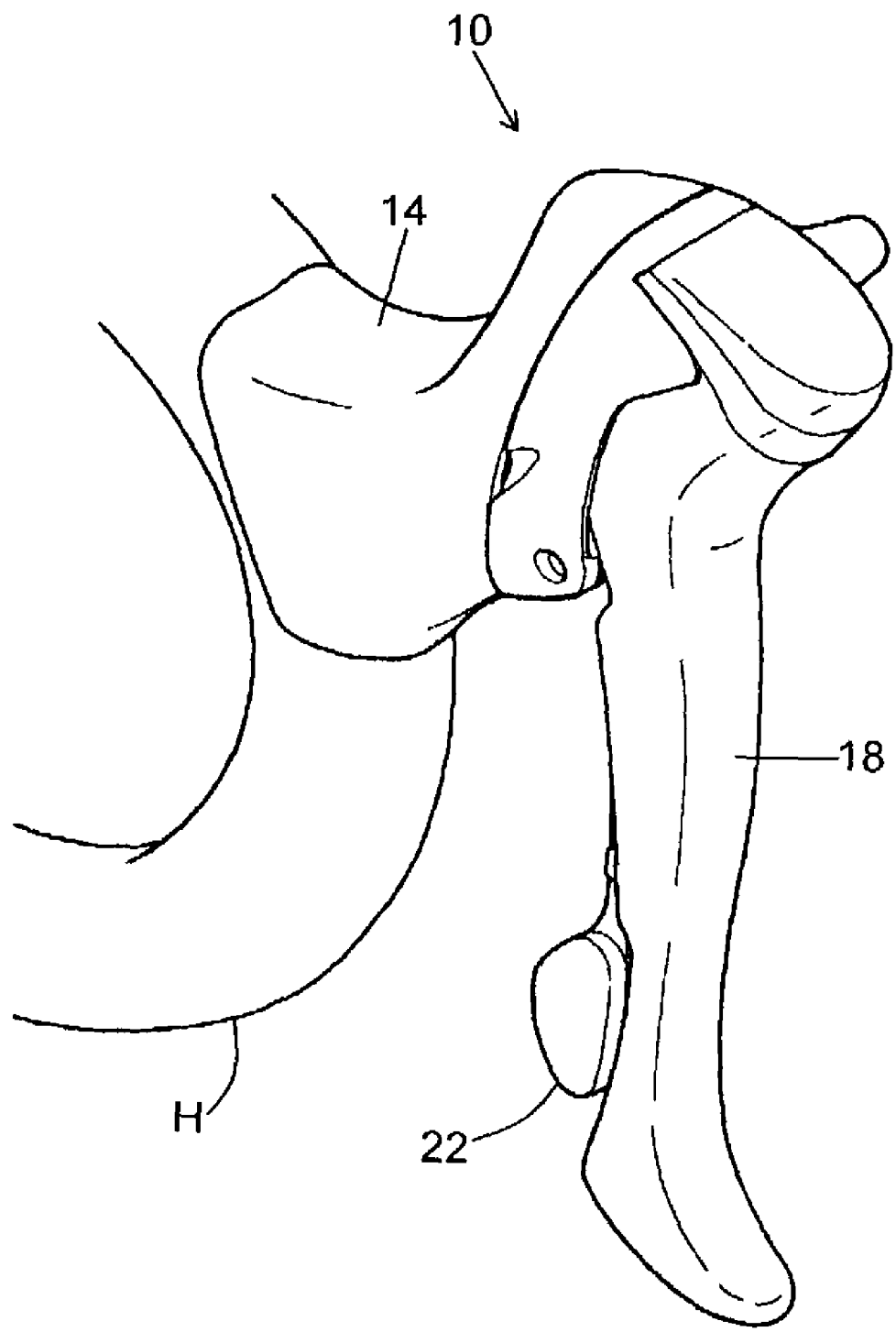
FIG. 1 is an oblique view of a combined brake/shift control device.

FIG. 1 is an oblique view of a combined brake/shift control device 10 attached to the forwardly curved portion of a handlebar H of well known construction. Brake/shift control device 10 includes a base member 14 attached to handlebar H, a brake lever 18 pivotably coupled to base member 14, and a shift control lever 22 pivotably coupled to brake lever 18. Brake lever 18 is coupled to base member 14 in a manner that allows brake lever 18 to pivot in a forward and rearward direction relative to handlebar H as well as in a lateral direction relative to handlebar H. Shift control lever 22 pivots in a lateral direction relative to handlebar H and brake lever 18.

Figure 2:
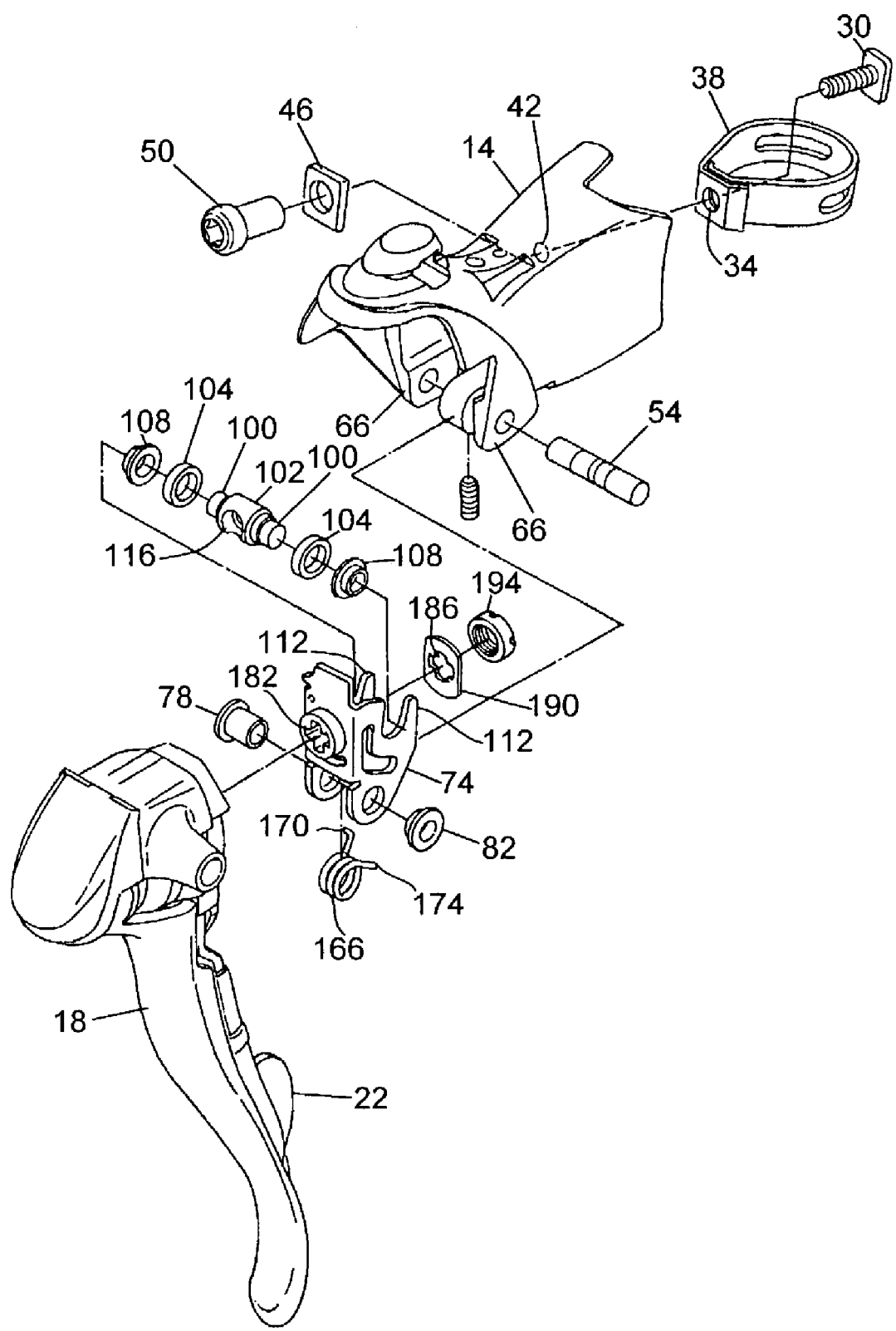
FIG. 2 is a partially exploded view of the combined brake/shift control device shown in FIG. 1.

FIG. 2 is a partially exploded view of the combined brake/shift control device 10. A screw 30 extends through an opening 34 in an attachment band 38, through an opening 42 in base member 14, through a square washer 46 and threadingly engages a nut 50 to attach attachment band 38 and thereby base member 14 to handlebar H in a known manner. A pivot shaft 54 is mounted to mounting ears 66 formed on base member 14, and a frame 74 is mounted to pivot shaft 54 through bushings 78 and 82 so that frame 74 can pivot in the forward and rearward direction. A coupling shaft 150 (FIG. 3) having splines 154 and threaded ends 158 and 162 is used to connect brake lever 18 to frame 74 so that brake lever 18 can pivot in the forward and rearward direction around pivot shaft 54. A biasing member in the form of a spring 166 having first and second ends 170 and 174 is wound around pivot shaft 54 such that spring end 170 engages frame 74 and spring end 174 engages base member 14 so that frame 74 and hence brake lever 18 are biased in a direction away from handlebar H. Mounting posts 100 of a brake cable terminating member 102, each surrounded by a bearing 104 and a retaining collar 108, are rotatably supported by respective hooks 112 formed on frame 74. Brake cable terminating member 102 includes a brake cable terminating opening 116 for receiving the inner wire and cable end bead of a brake control bowden cable in a known manner.

Figure 3:
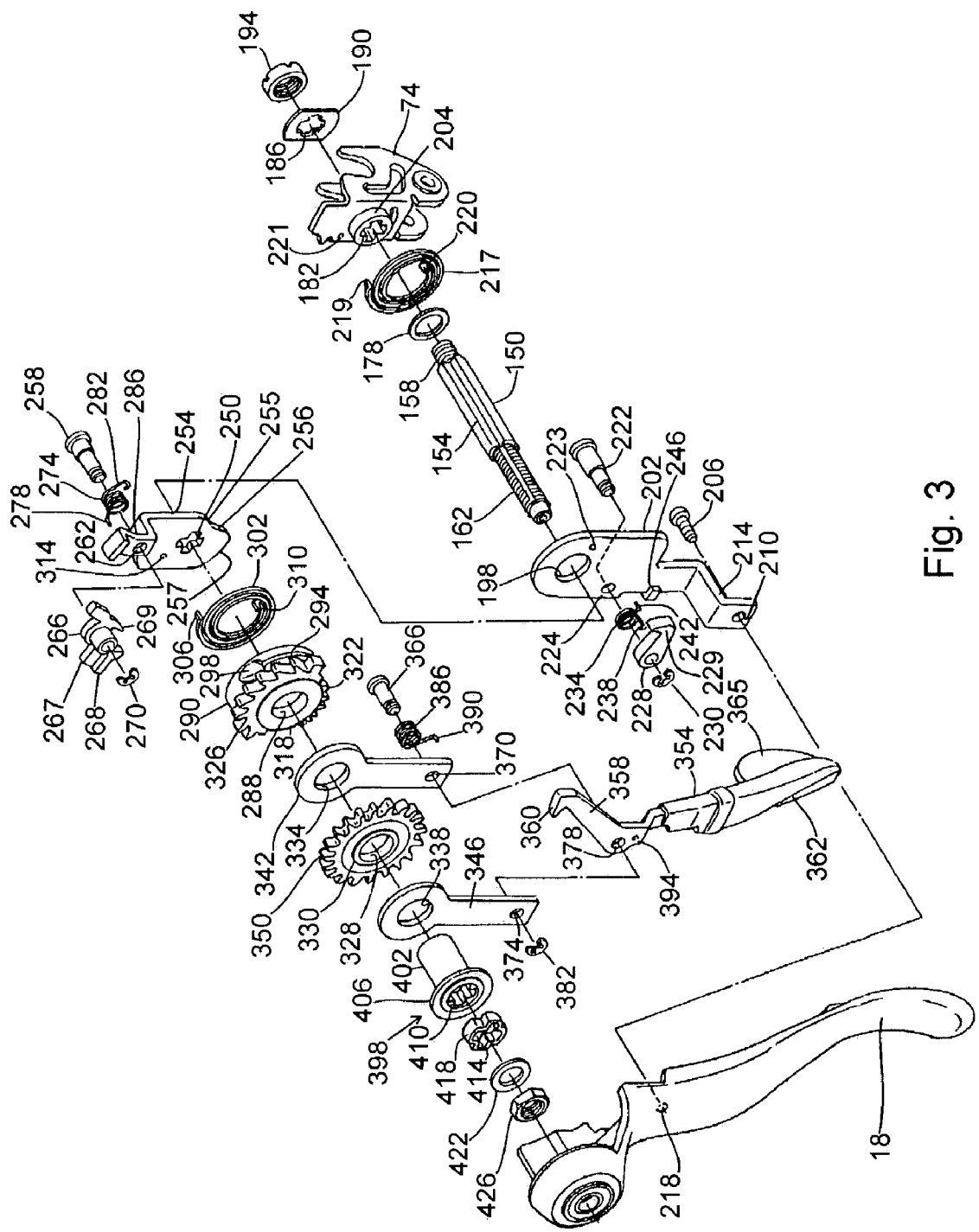
FIG. 3 is an exploded view of the shift control portion of the combined brake/shift control device shown in FIG. 1.

FIG. 3 is an exploded view of the shift control portion of the combined brake/shift control device 10. Coupling shaft 150 extends through a bearing washer 178, through a splined opening 182 in frame 74, and through a splined opening 186 in a square washer 190. A nut 194 is screwed onto the threaded end 158 of coupling shaft 150 so that coupling shaft 150 is nonrotatably mounted to frame 74. A bearing collar 204 formed on frame 74 extends through an opening 198 in a drive plate 202 so that drive plate 202 is rotatably supported relative to frame 74. Drive plate 202 functions as a position setting member in a manner discussed below. A screw 206 extends through an opening 210 in a coupling ear 214 and screws into a threaded opening 218 in brake lever 18 so that brake lever 18 and drive plate 202 rotate integrally around bearing collar 204. A brake lever return spring 217 having spring ends 219 and 220 surrounds bearing collar 204. Spring end 219 is disposed in an opening 221 in frame 74, and spring end 220 is disposed in an opening 223 in drive plate 202 so that drive plate 202, and hence brake lever 18, is biased in a clockwise direction in FIG. 3. A drive pawl shaft 222 extends through an opening 224 in drive plate 202 and rotatably supports a drive pawl 228 having a drive pawl tooth 229. Drive pawl 228 is retained on drive pawl shaft 222 by a clip 230. A drive pawl spring 234 having spring ends 238 and 242 surrounds drive pawl shaft 222. Spring end 238 engages drive pawl 228, and spring end 242 engages a spring abutment 246 on drive plate 202 so that drive pawl 222 is biased in the counterclockwise direction.

Coupling shaft 150 also extends through a splined opening 250 in a position maintaining plate 254 so that position maintaining plate 254 is nonrotatably supported on coupling shaft 150. Position maintaining plate 254 includes a drive pawl control surface 255 having a radially inner surface 256 and a radially outer surface 257 that cooperate with drive pawl 228 in a manner described below. A position maintaining pawl shaft 258 extends through an opening 262 in position maintaining plate 254 and rotatably supports a position maintaining pawl 266. Position maintaining pawl 266 includes a position maintaining portion or member 267, a position release portion or member 268, and a motion limiting portion or member 269. Position maintaining pawl 266 is retained on position maintaining pawl shaft 258 by a clip 270. A position maintaining member biasing mechanism in the form of a position maintaining pawl spring 274 having spring ends 278 and 282 surrounds position maintaining pawl shaft 258. Spring end 278 engages position maintaining pawl 266, and spring end 282 engages a side edge 286 of position maintaining plate 254 so that position maintaining pawl 266 is biased in a counterclockwise direction.

Coupling shaft 150 extends through a splined opening 410 formed in a cylindrical portion 402 of a bushing 398 which abuts against position maintaining plate 254. Cylindrical portion 402 of bushing 398 extends through an opening 288 in a wire takeup drum 290 so that wire takeup drum 290 is rotatably supported relative to coupling shaft 150. Wire takeup drum 290 includes a wire winding groove 294 and a cable terminating opening 298 for receiving the cable end bead of a shift control wire (not shown) in a known manner. A biasing mechanism in the form of a return spring 302 having spring ends 306 and 310 surrounds the cylindrical portion 402 of bushing 398. Spring end 306 is disposed in an opening 314 formed in position maintaining plate 254, and spring end 310 is disposed in an opening (not shown) in wire takeup drum 290 so that wire takeup drum 290 is biased in a clockwise (first) direction. In this embodiment, wire takeup drum 290 is integrally formed with a positioning unit 318 in the form of a positioning wheel. Positioning unit 318 includes a plurality of circumferentially disposed drive abutments in the form of drive teeth 322 and a plurality of circumferentially disposed position maintaining abutments in the form of position maintaining teeth 326. As discussed in more detail below, drive pawl 228 engages drive teeth 322 to rotate wire takeup drum 290 counterclockwise, and position maintaining pawl 266 engages position maintaining teeth 326 to function as a position maintaining mechanism to maintain positioning unit 318 and thereby wire takeup drum 290 in one of a plurality of predetermined rotational positions.

Cylindrical portion 402 of bushing 398 extends through an opening 328 in a release member in the form of a release wheel 330 and through openings 334 and 338 in release pivot plates 342 and 346 that straddle release wheel 330 so that release wheel 330 and release pivot plates 342 and 346 are rotatably supported relative to coupling shaft 150 coaxially with positioning unit 318 and wire takeup drum 290. Release wheel 330 includes a plurality of position releasing abutments in the form of release teeth 350 formed around the entire circumference thereof. Release pivot plates 342 and 346 also straddle a release control lever 354 that includes a finger contact projection 362 and a release control pawl 358 having a release control pawl tooth 360. A pivot shaft 366 extends through respective openings 370 and 374 in release pivot plates 342 and 346 and through an opening 378 in release control lever 354 so that release control lever 354 can pivot relative to release pivot plates 342 and 346. Release control lever 354 and release pivot plates 342 and 346 are retained to pivot shaft 366 by a clip 382. A spring 386 having two spring ends (only spring end 390 is shown in the drawings) surrounds pivot shaft 366. The hidden end of spring 386 engages drive plate 202, and spring end 390 is disposed in an opening 394 in release control lever 354 so that release control lever 354 is biased in a clockwise direction relative to drive plate 202. Finger contact projection 362 includes a rearwardly extending finger contact paddle 365 so the rider can easily move that release control lever 354 laterally.

Coupling shaft 150 exits splined opening 410 in bushing 398 and extends through a splined opening 414 in a spacer 418 and through a washer 422. A nut 426 is screwed onto the threaded end 162 of coupling shaft 150 to press against a flange portion 406 of busing 398 and thereby press bushing 398 against position maintaining plate 254. Flange portion 406 of bushing 398 also retains takeup drum 290, release wheel 330 and release pivot plates 342 and 346 in the assembled form.

Figure 4A:
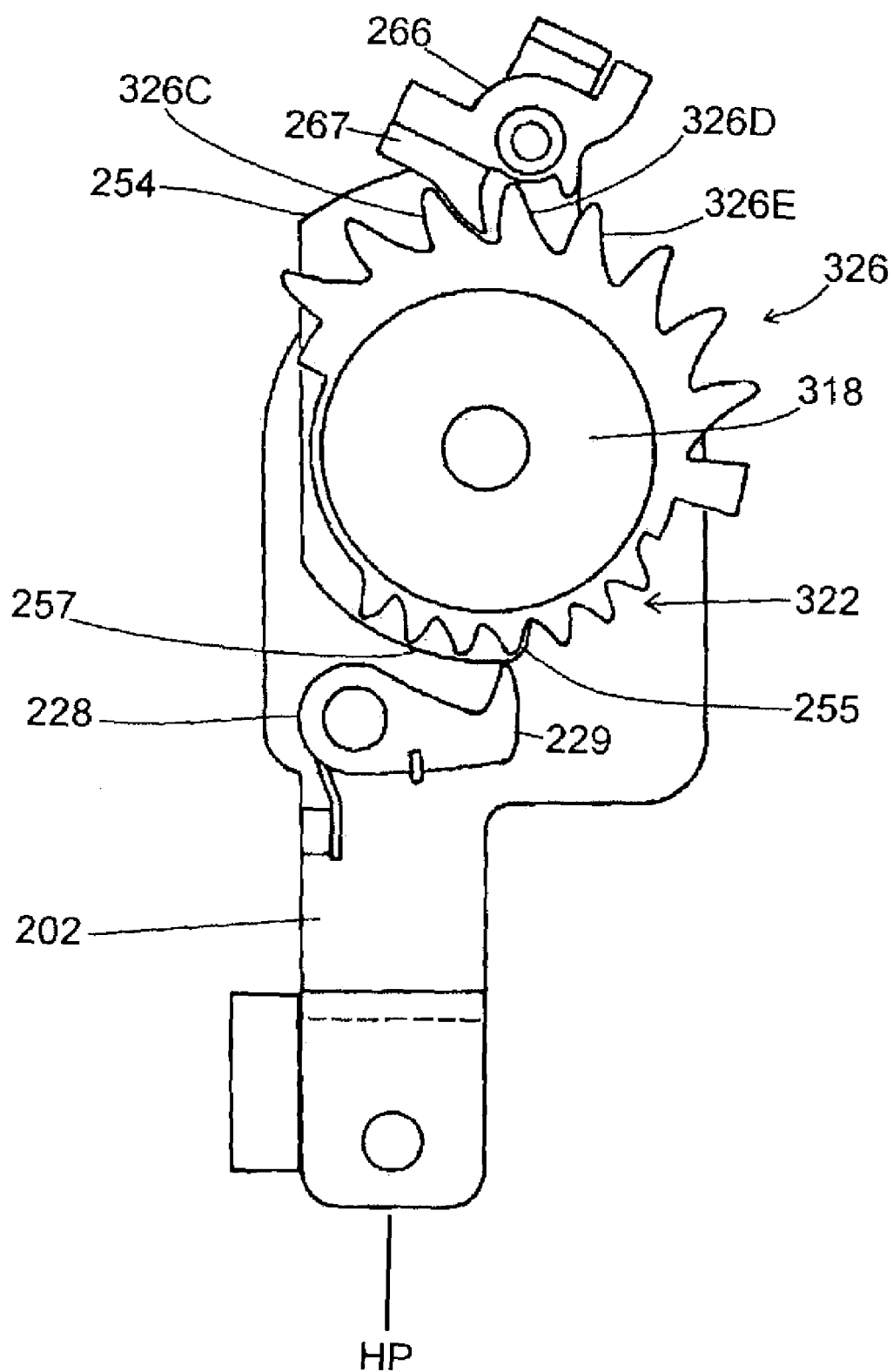
FIGS. 4(A)–4(D) are views illustrating the operation of the combined brake/shift control device in a downshifting direction.

FIGS. 4(A)–4(D) are views illustrating the operation of the combined brake/shift control device 10 in a downshifting direction (i.e., when the rider pushes brake lever 18 counterclockwise). FIG. 4(A) shows drive plate 202, which rotates integrally with brake lever 18, in a home position HP. In this position, position maintaining portion 267 of position maintaining pawl 266 abuts against a position maintaining tooth 326C of positioning unit 318 because position maintaining pawl 266 is biased in the counterclockwise direction by position maintaining pawl spring 274 and positioning unit 318 is biased in the clockwise direction by return spring 302. At the same time, drive pawl tooth 229 of drive pawl 228 rests on radially outer surface 257 of drive pawl control surface 255 so that drive pawl tooth 229 is disengaged from drive teeth 322.

Figure 4B:
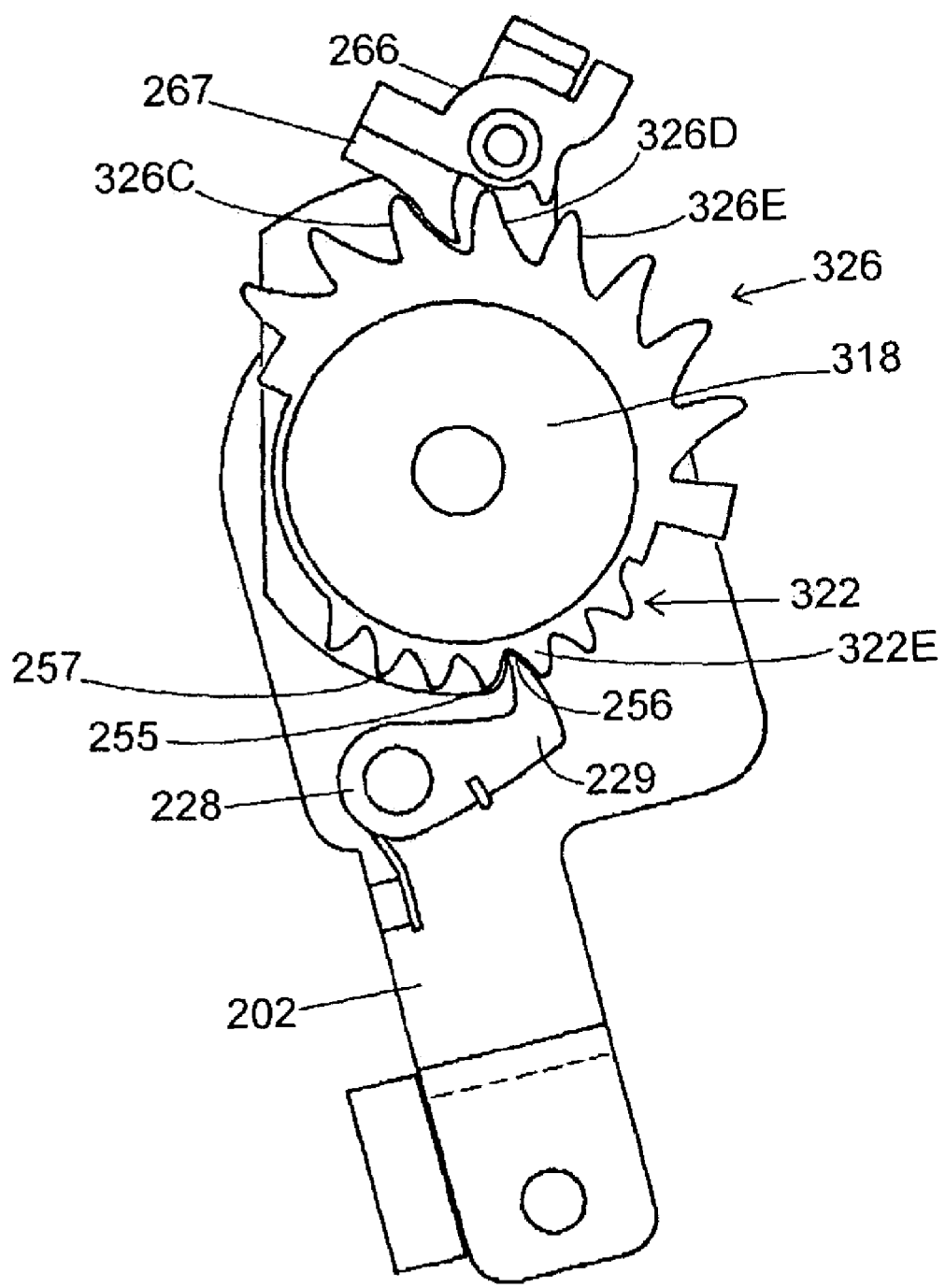

FIG. 4(B) shows drive plate 202 rotated slightly counterclockwise. In this position, drive pawl tooth 229 of drive pawl 228 has moved from the radially outer surface 257 of drive pawl control surface 255 to the radially inner surface 256 of drive pawl control surface 255 because drive pawl 228 is biased on the counterclockwise direction by drive pawl spring 234. At the same time, drive pawl tooth 229 engages a drive tooth 322E, and position maintaining portion 267 of position maintaining pawl 266 continues to abut against positioning tooth 326C.

Figure 4C:
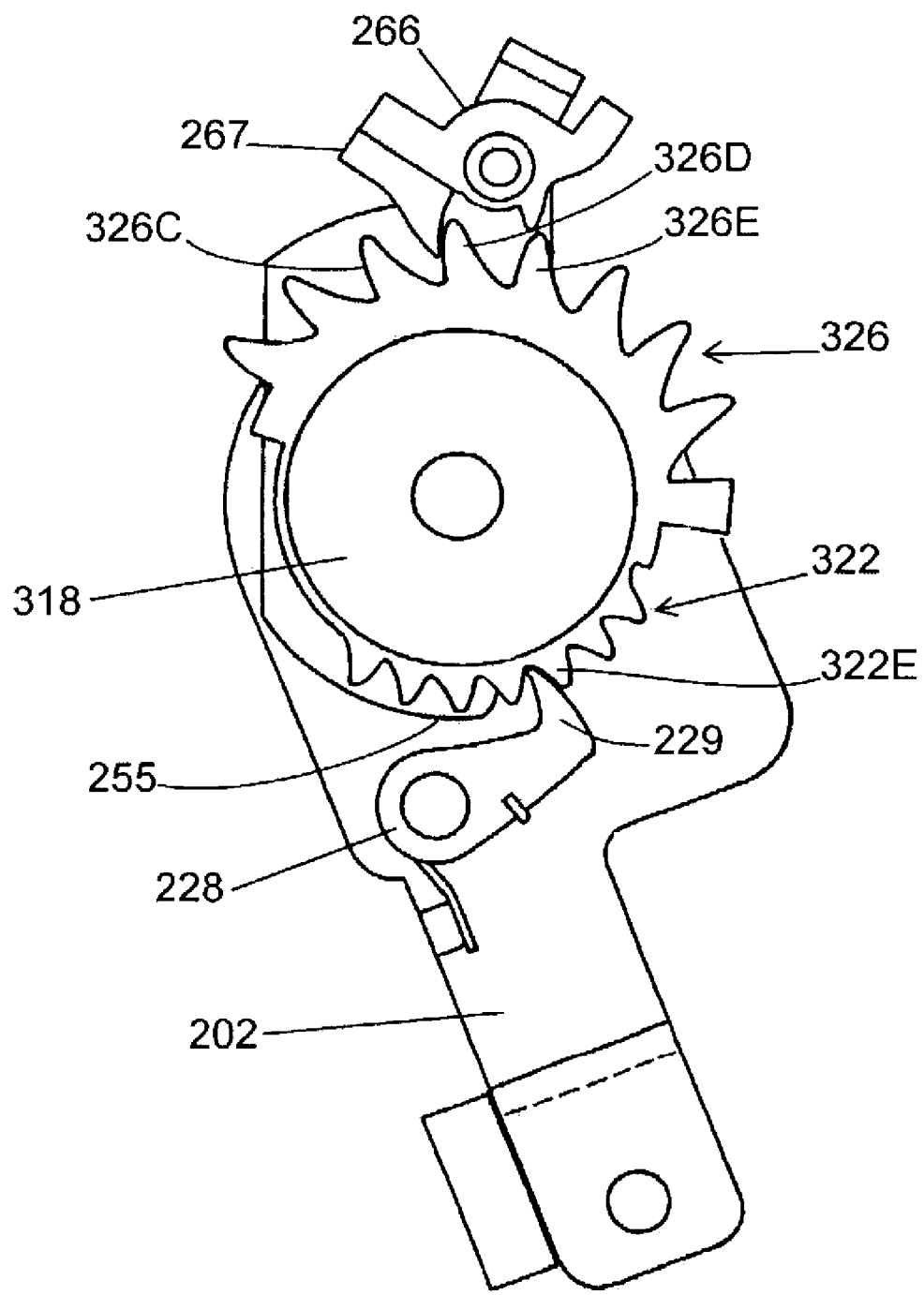

FIG. 4(C) shows drive plate 202 further rotated counterclockwise. In this position, drive pawl tooth 229 of drive pawl 228 has rotated positioning unit 318 counterclockwise against the biasing force of return spring 302. At the same time, position maintaining portion 267 of position maintaining pawl 266 rides up the left side of positioning tooth 326D and rotates position maintaining pawl 266 clockwise against the biasing force of position maintaining pawl spring 274. Further counterclockwise rotation of drive plate 202 causes the position maintaining portion 267 of position maintaining pawl 266 to ride up and over the tip of positioning tooth 326D. Thereafter, the position maintaining portion 267 of position maintaining pawl 266 rotates counterclockwise in accordance with the biasing force of position maintaining pawl spring 274 and enters the space between position maintaining tooth 326D and position maintaining tooth 326E.

Figure 4D:
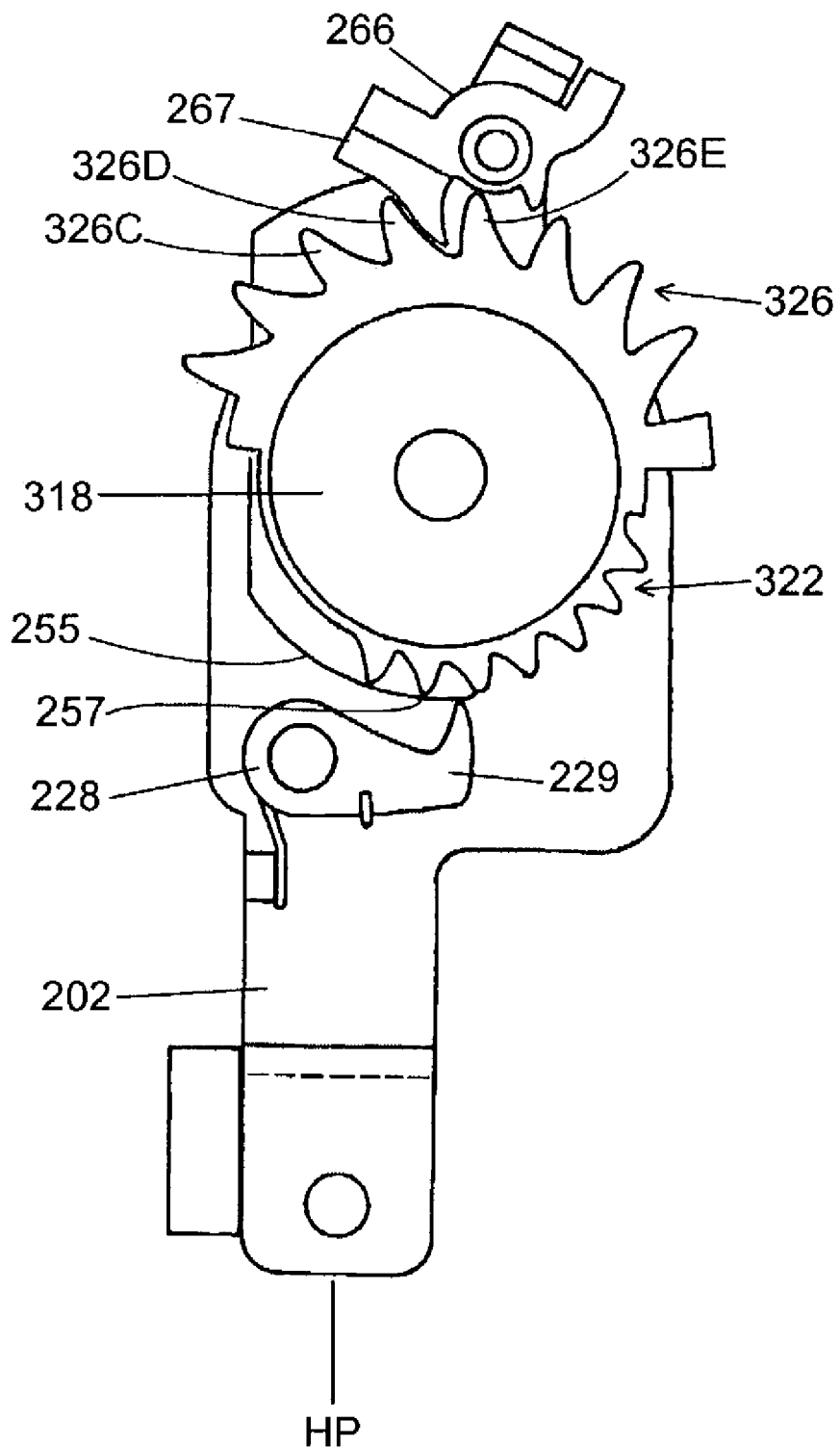

FIG. 4(D) shows drive plate 202 after the rider has rotated it clockwise via brake lever 18 back to the home position HP. As drive plate 202 rotates clockwise from the position shown in FIG. 4(C), positioning unit 318 initially rotates clockwise in accordance with the biasing force of return spring 302, but such rotation is stopped because the position maintaining portion 267 of position maintaining pawl 266 abuts against positioning maintaining tooth 326D Thereafter, drive pawl tooth 229 of drive pawl 228 moves to the radially outer surface 257 of drive pawl control surface 255 so that drive pawl tooth 229 again is disengaged from drive teeth 322.

Figure 5A:
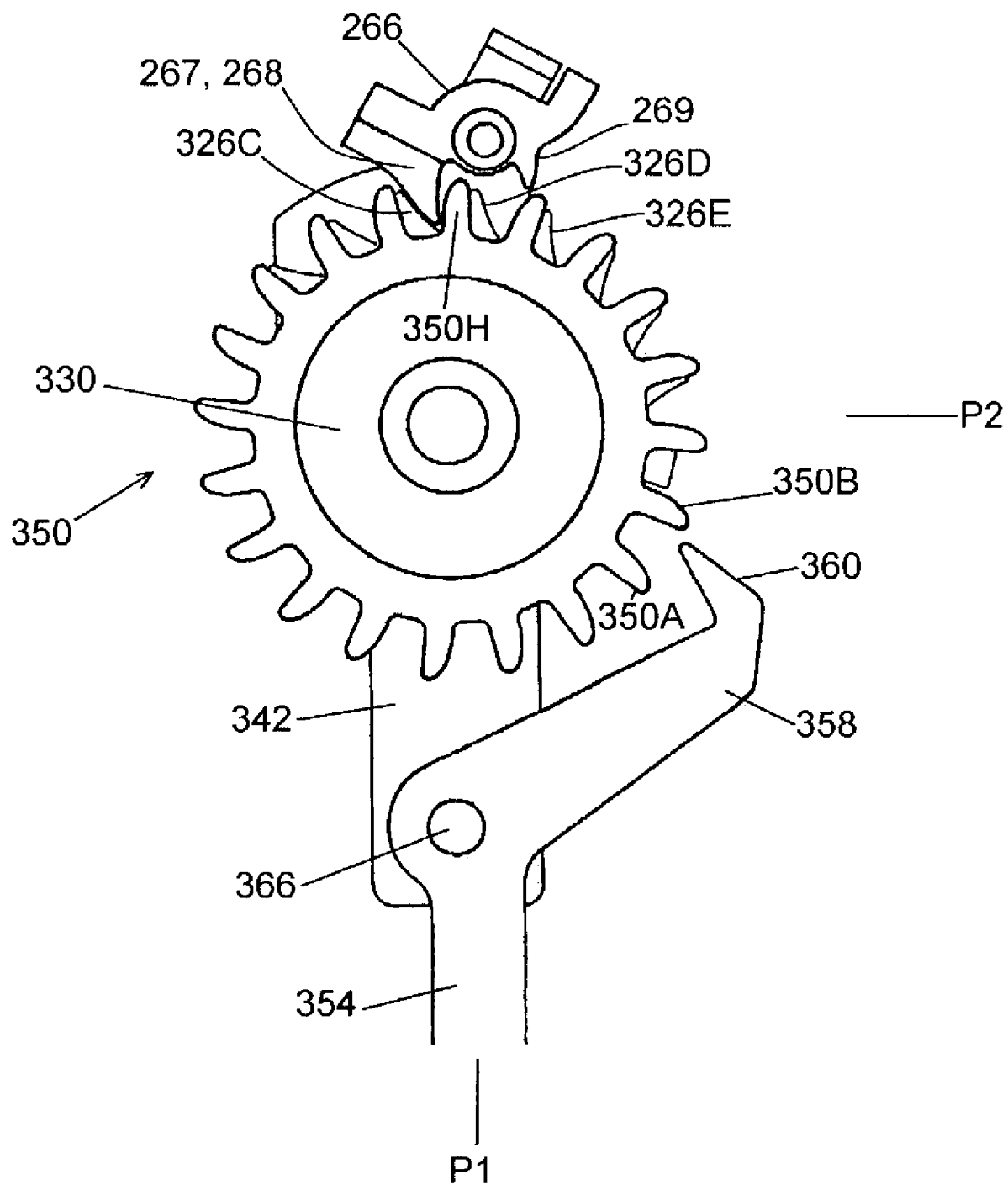
FIGS. 5(A)–5(F) are views illustrating the operation of the combined brake/shift control device in an upshifting direction.

FIGS. 5(A)–5(F) are views illustrating the operation of the combined brake/shift control device 10 in an upshifting direction (i.e., when the rider pushes release control lever 354 counterclockwise). FIG. 5(A) shows release control lever 354 in a home (first) position P1. In this position, position maintaining portion 267 of position maintaining pawl 266 abuts against positioning tooth 326C (the same position shown in FIG. 4(A)). At the same time, release control pawl tooth 360 of release control pawl 358 is separated from the release teeth 350 on release wheel 330 as a result of the biasing force of spring 386.

Figure 5B:
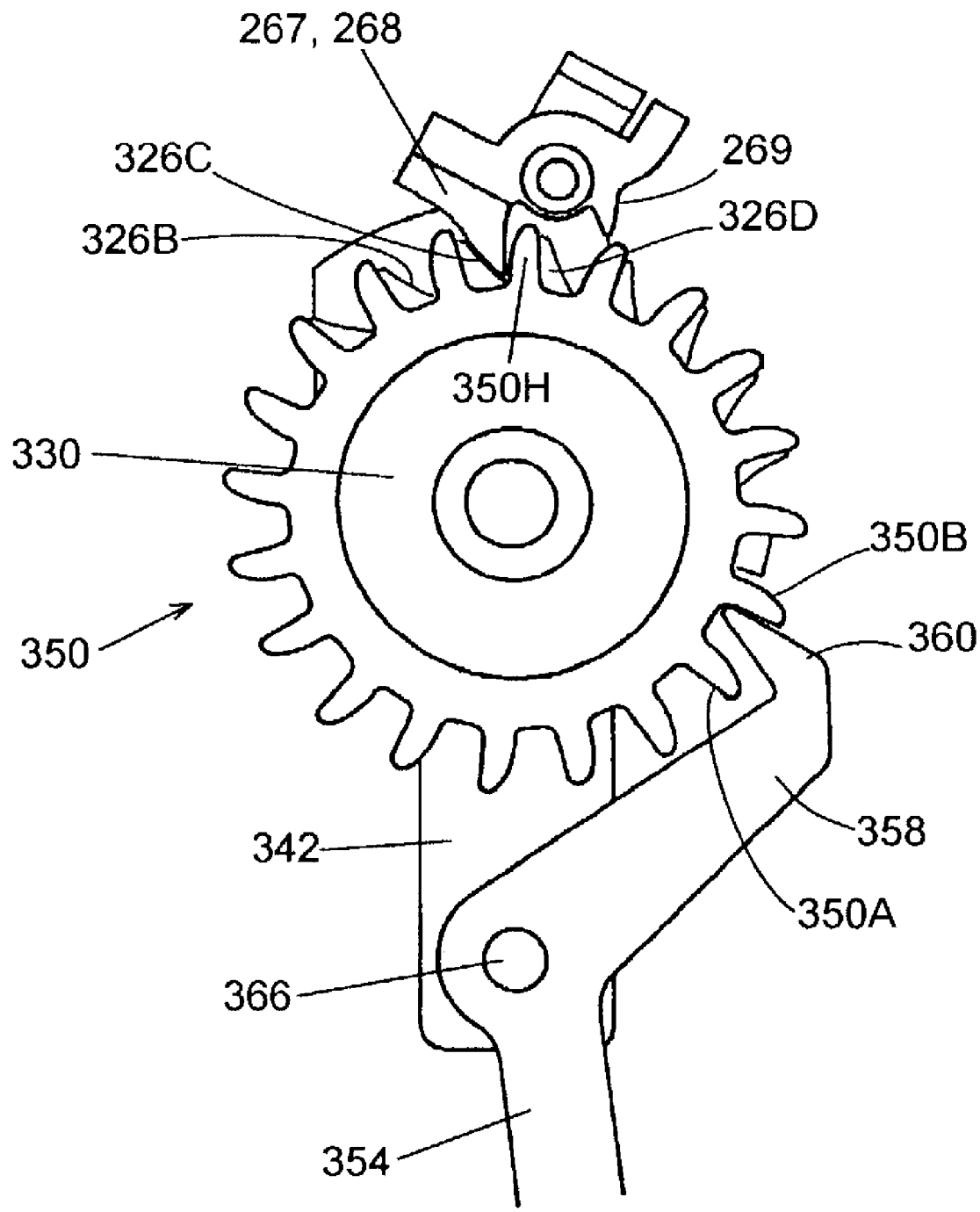

FIG. 5(B) shows the components during initial counterclockwise rotation of release control lever 354 (i.e., in a position releasing (second) direction). Initially, release control lever 354 rotates counterclockwise around pivot shaft 366, and release control pawl tooth 360 of release control pawl 358 enters the space between release teeth 350A and 350B. Thereafter, release control pawl tooth 360 of release control pawl 358 abuts against the side surface of release tooth 350B. At this time, release pivot plates 342 and 346 remain stationary.

Figure 5C:
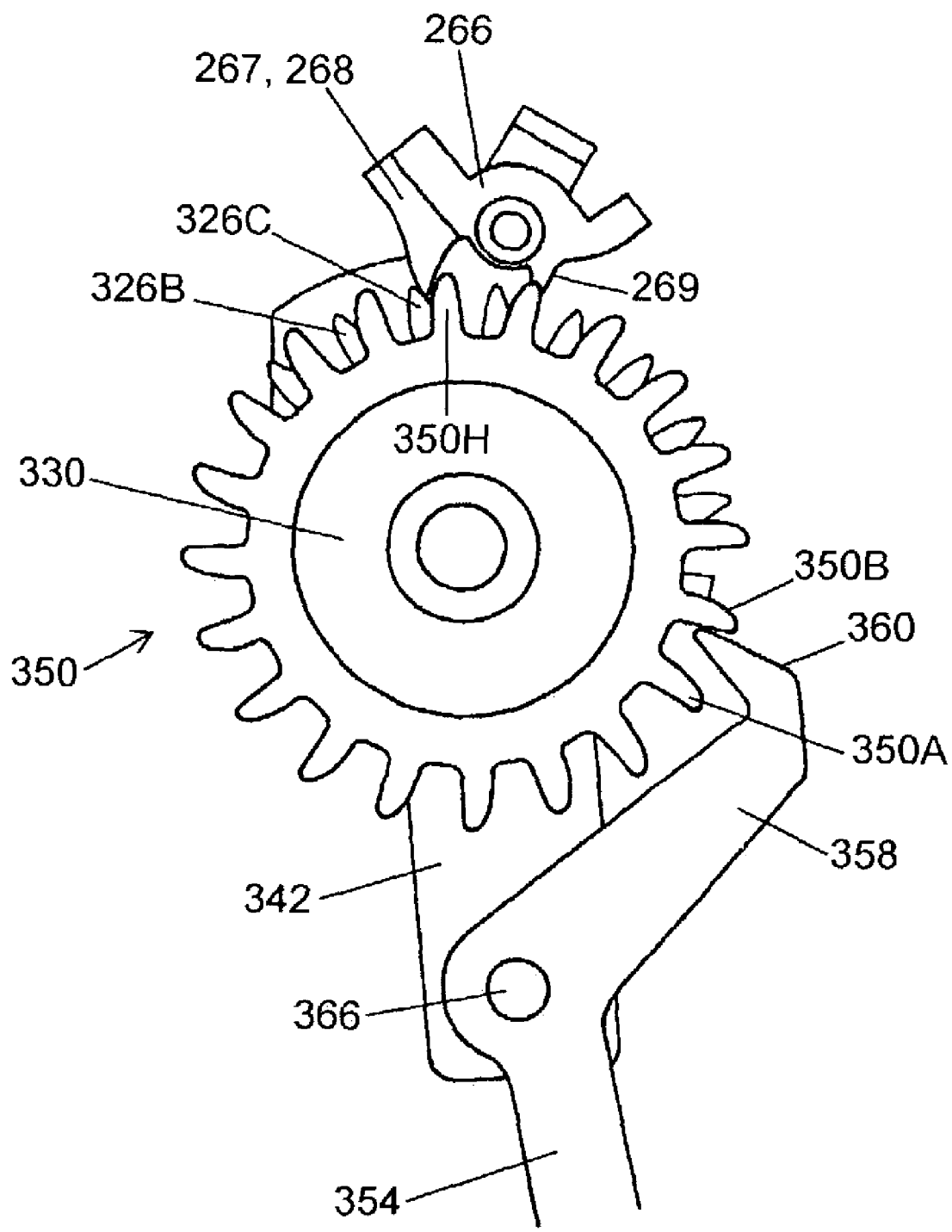

As shown in FIG. 5(C), further rotation of release control lever 354 causes release pivot plates 342 and 346 and release wheel 330 to rotate counterclockwise. This, in turn, causes a release tooth 350H of release wheel 330 to press against position release portion 268 of position maintaining pawl 266, thus rotating position maintaining pawl 266 clockwise. Since position maintaining portion 267 of position maintaining pawl 266 is integrally formed with position release portion 268, position maintaining portion 267 of position maintaining pawl 266 also rides up the right side surface of position maintaining tooth 326(C).

Figure 5D:
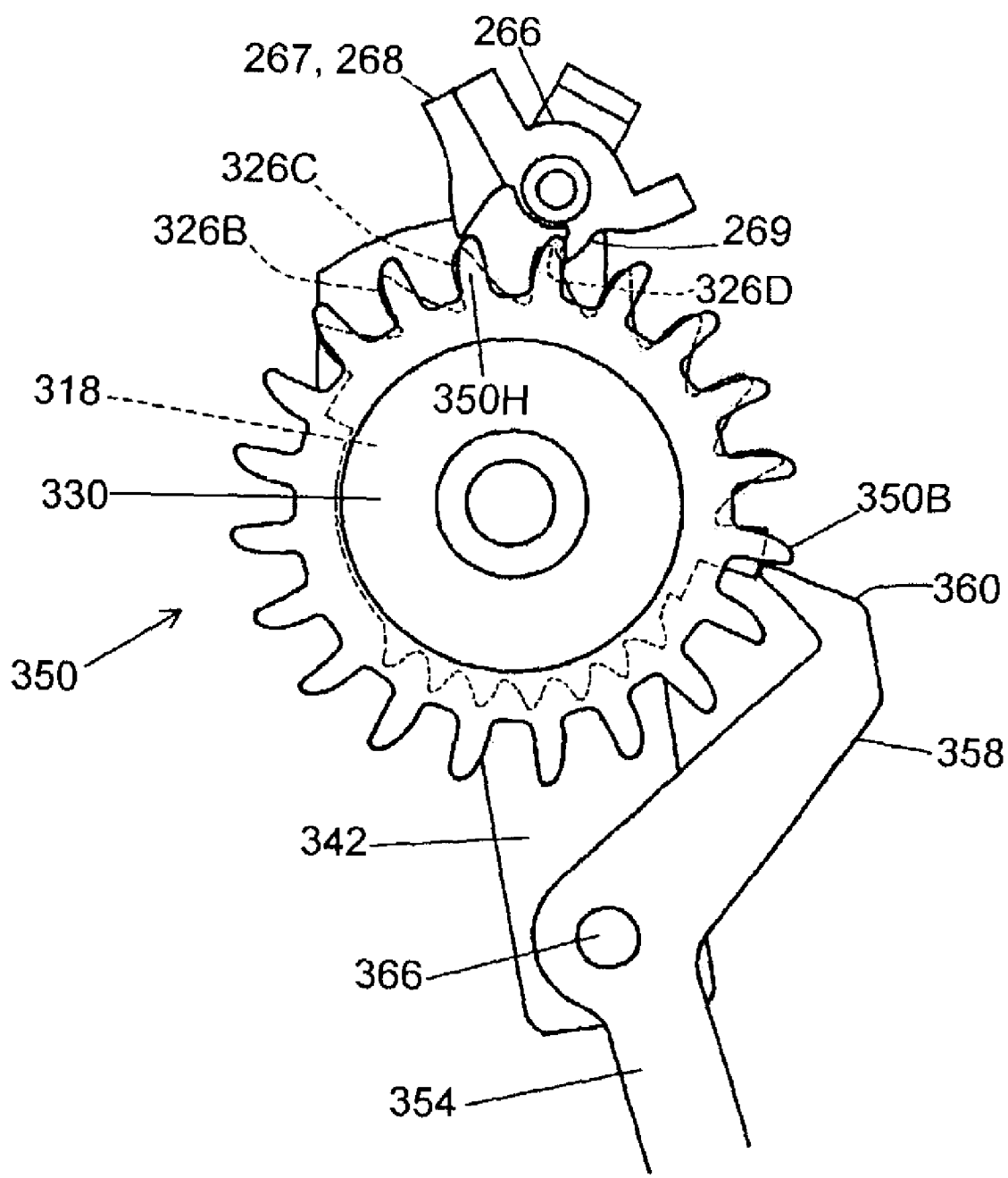
Figure 5E:
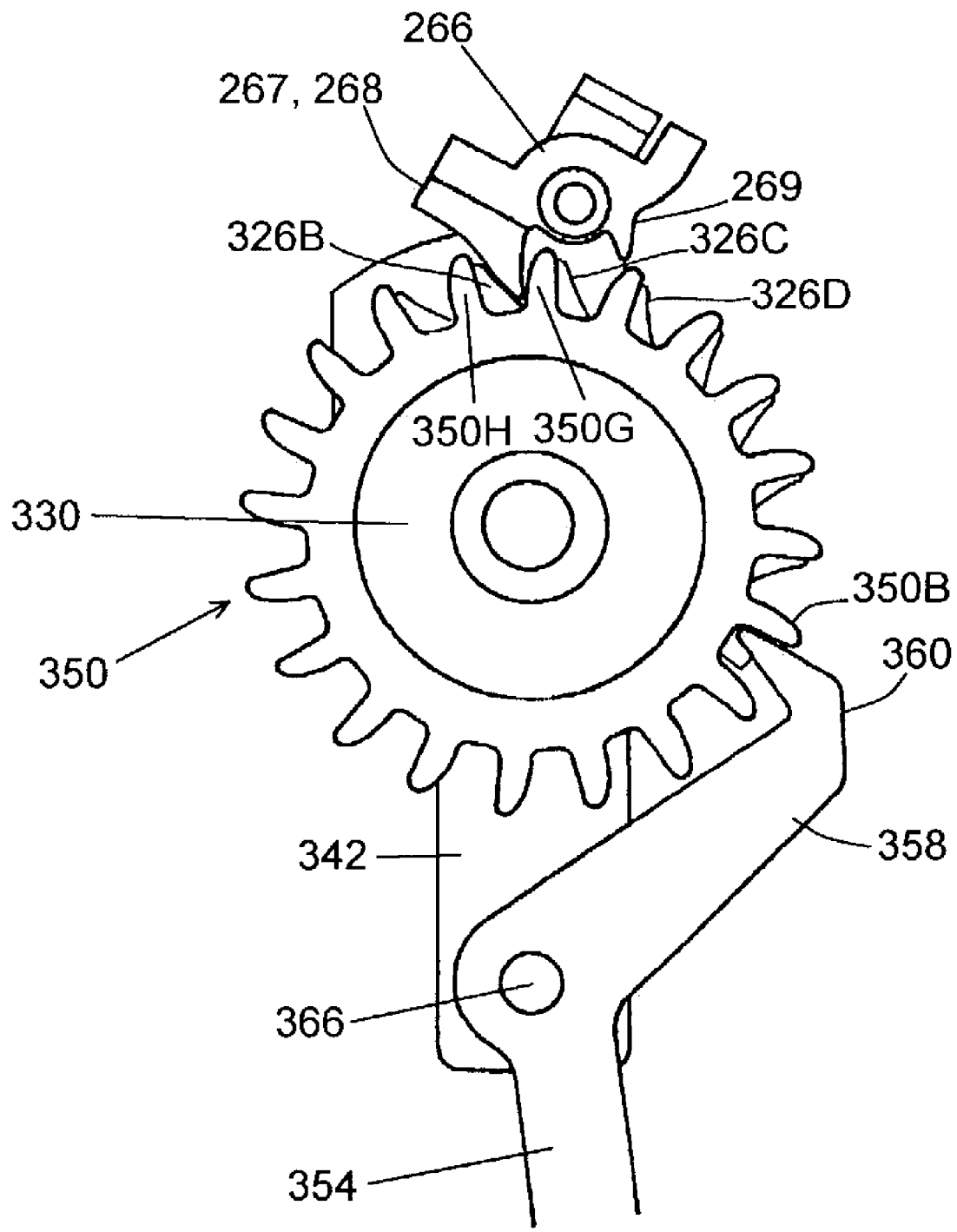

As soon as position maintaining portion 267 of position maintaining pawl 266 rides over the tip of position maintaining tooth 326C of positioning unit 318, positioning unit 318 rotates clockwise in accordance with the biasing force of return spring 302 as shown in FIG. 5(D). However, rotation of positioning unit 318 is stopped when position maintaining tooth 326D abuts against the motion limiting portion 269 of position maintaining pawl 266. Release tooth 350H of release wheel 330 has maintained position maintaining pawl 266 in the clockwise position at this time. This provides for intermittent movement of positioning unit 318 in response to continued movement of release wheel 330 in the position releasing direction. As release wheel 330 continues to rotate counterclockwise and the position release portion 268 of position maintaining pawl 266 clears the tip of release tooth 350H, the position maintaining portion 267 of position maintaining pawl 266 rotates counterclockwise in accordance with the biasing force of position maintaining pawl spring 274 and enters the space between position maintaining tooth 326B and 326C. Similarly, the position release portion 268 of position maintaining pawl 266 enters the space between release tooth 350H and a release tooth 350G. Further clockwise rotation of position maintaining pawl 266 disengages the motion limiting portion 269 of position maintaining pawl 266 from position maintaining tooth 326D. This, in turn, allows positioning unit 318 to continue rotating clockwise until position maintaining tooth 326B abuts against position maintaining portion 267 of position maintaining pawl 266 as shown in FIG. 5(E). This completes the shift operation by one speed step even though release control lever 354 has not reversed direction (i.e., has not moved back toward the home position).

Figure 5F:
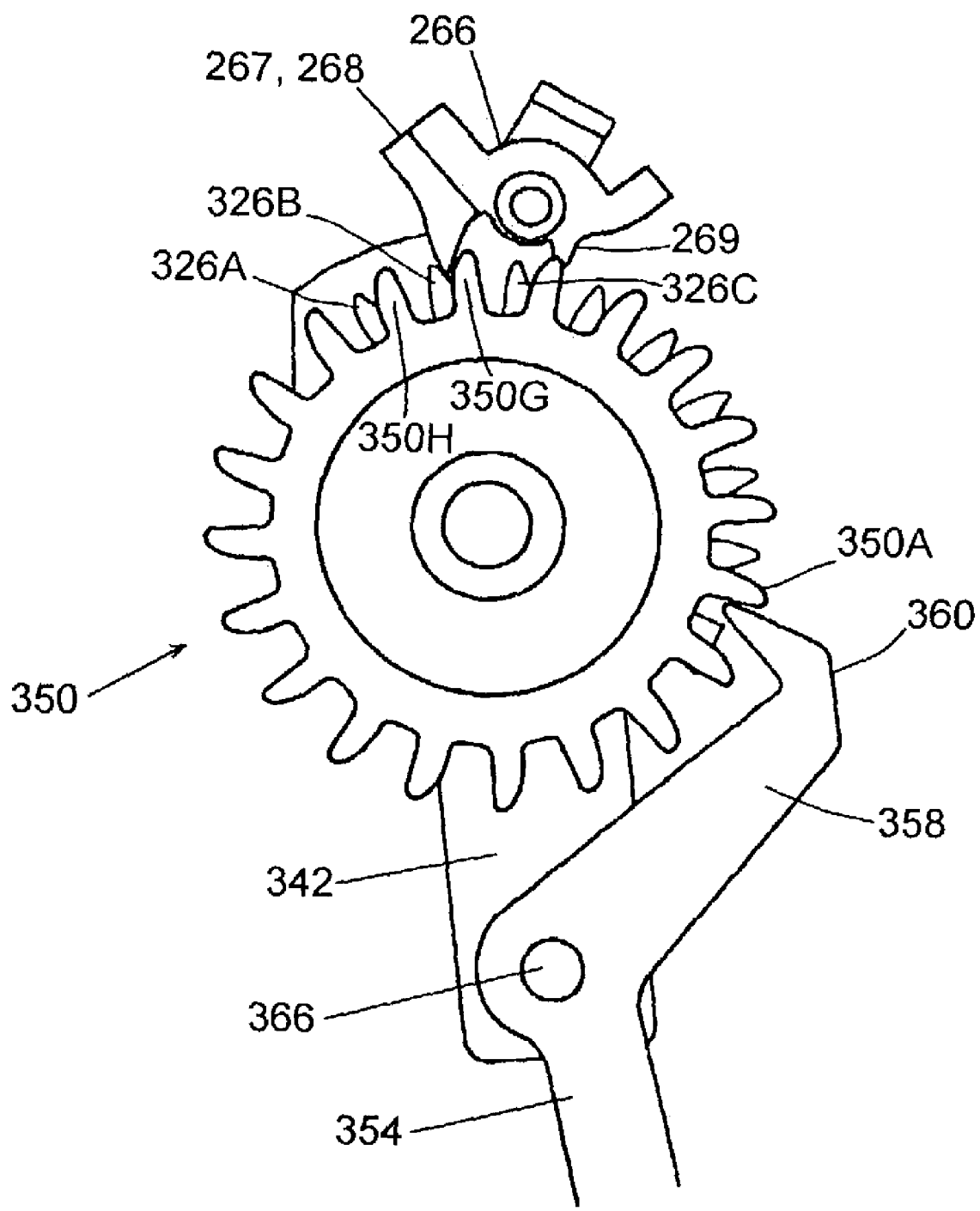

If desired, the rider may rotate release control lever 354 back to the home position P1 to accomplish a single shift, and then again rotate release control lever 354 counterclockwise as shown in FIG. 5(F) to shift the transmission by another step. In this case, a release tooth 350G of release wheel 330 presses against position release portion 268 of position maintaining pawl 266, thus rotating position maintaining pawl 266 clockwise. The position maintaining portion 267 of position maintaining pawl 266 rides up the right side of position maintaining tooth 326B, and the process proceeds in the same manner as in FIGS. 5(C)–5(E).

In this embodiment, it is not necessary for the rider to return release control lever 354 to the home position P1 after every single shift to complete the shift. Instead, continued counterclockwise rotation of release control lever 354 from the home position P1 to an arbitrary second position P2 (determined by the particular application) continues the clockwise rotation of release wheel 330, thus repeating the process shown in FIGS. 5(C)–5(E) over and over again to complete a plurality of shifts. It is not necessary to rotate release control lever 354 back to the home position P1 before shifting to another gear. Thus, the rider can perform a single shift or multiple shifts as desired.

Once the rider has shifted the desired number of speeds, the rider then may rotate release control lever 354 back to the home position P1. At that time, both release control lever 354 and release pivot plates 342 and 346 rotate clockwise, thus disengaging pawl tooth 360 of release control pawl 358 from release teeth 350. Since pawl tooth 360 of release control pawl 358 disengages from release teeth 350 whenever release control lever 354 rotates clockwise, there is no corresponding clockwise movement of release wheel 330. Thus, release wheel 330 effectively rotates in only one direction.

While the above is a description of various embodiments of inventive features, further modifications may be employed without departing from the spirit and scope of the present invention. For example, while multiple shifts were described in the context of upshifting, the teachings of the present invention can be applied to any system where there is provided a positioning unit that is adapted to be biased in any direction and a position maintaining mechanism that maintains the positioning unit in a plurality of predetermined positions. The shift lever need not be connected to the brake lever (e.g., it could be coupled to the base member 14), and the multiple shifting mechanism may be used by itself without requiring both levers to perform multiple shifts.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A position release mechanism for a bicycle control device comprising:
   a positioning unit that is adapted to be biased in a first biased direction;
   a position maintaining mechanism including a position maintaining member that maintains the positioning unit in a plurality of predetermined positions corresponding to speed steps of a bicycle transmission when the positioning unit is biased in the first biased direction, wherein the position maintaining member rotates in opposite first and second directions when the positioning unit moves between a consecutive pair of the plurality of predetermined positions; and
   a position releasing mechanism that moves in a position releasing direction, wherein the position releasing mechanism includes a release member that is operatively coupled to the position maintaining mechanism and causes the position maintaining member to rotate in the first and second directions a plurality of times for a single movement of the release member in the position releasing direction so that the positioning unit moves in the first biased direction through at least two of the plurality of predetermined positions for the same bicycle transmission.

2. The position release mechanism according to claim 1 wherein the position maintaining mechanism causes the positioning unit to temporarily stop at at least one of the plurality of predetermined positions in the first biased direction in response to the progressive movement of the position releasing mechanism in the position releasing direction.

3. The position release mechanism according to claim 1 wherein the position maintaining mechanism causes the positioning unit to move through the plurality of predetermined positions in the first biased direction in response to a continuous movement of the position releasing mechanism in the position releasing direction.

4. The position release mechanism according to claim 1 wherein the position maintaining mechanism causes the positioning unit to move intermittently through the plurality of predetermined positions in the first biased direction in response to the continuous movement of the position releasing mechanism in the position releasing direction.

5. The position release mechanism according to claim 4 further comprising a biasing mechanism that biases the positioning unit in the first biased direction.

6. The position release mechanism according to claim 1 wherein the position maintaining mechanism further comprises a plurality of position maintaining abutments.

7. The position release mechanism according to claim 6 wherein engagement of the position maintaining member with at least one of the plurality of position maintaining abutments maintains the positioning unit in at least one of the plurality of predetermined positions.

8. The position release mechanism according to claim 7 wherein engagement of the position maintaining member with each of the plurality of position maintaining abutments maintains the positioning unit in corresponding ones of the plurality of predetermined positions.

9. The position release mechanism according to claim 8 wherein the positioning unit comprises one of the position maintaining member and the plurality of position maintaining abutments.

10. The position release mechanism according to claim 9 wherein the position maintaining member comprises a position maintaining pawl, and wherein the plurality of position maintaining abutments comprise a plurality of position maintaining teeth.

11. The position release mechanism according to claim 10 wherein the positioning unit comprises the plurality of position maintaining teeth.

12. The position release mechanism according to claim 11 further comprising a biasing mechanism that biases the positioning unit in the first biased direction.

13. The position release mechanism according to claim 8 wherein the position releasing mechanism comprises a release member having a plurality of position releasing abutments.

14. The position release mechanism according to claim 13 wherein movement of the release member in the position releasing direction causes at least one of the plurality of position releasing abutments to disengage the position maintaining member from its corresponding position maintaining abutment.

15. The position release mechanism according to claim 14 wherein the position maintaining mechanism further comprises a motion limiting member that limits movement of the positioning unit in the first biased direction after disengagement of the position maintaining member from its corresponding position maintaining abutment.

16. The position release mechanism according to claim 15 further comprising a position maintaining member biasing mechanism that biases the position maintaining member toward engagement with the plurality of position maintaining abutments.

17. The position release mechanism according to claim 16 wherein movement of the release member in the position releasing direction causes selected ones of the plurality of position releasing abutments to repetitively disengage the position maintaining member from its corresponding position maintaining abutments.

18. The position release mechanism according to claim 17 wherein the motion limiting member pauses motion of the positioning unit at a location where the position maintaining member can engage one of the plurality of positioning maintaining abutments.

19. The position release mechanism according to claim 18 wherein the release member comprises a release wheel, and wherein the plurality of position releasing abutments comprise a plurality of release teeth disposed in a circumferential direction on the release wheel.

20. The position release mechanism according to claim 19 wherein the plurality of release teeth are disposed completely around the release wheel.

21. The position release mechanism according to claim 19 wherein the position maintaining member comprises a position maintaining pawl, wherein the positioning unit comprises a positioning wheel, and wherein the plurality of position maintaining abutments comprise a plurality of position maintaining teeth disposed in a circumferential direction on the positioning wheel.

22. The position release mechanism according to claim 21 wherein the release wheel rotates coaxially relative to the positioning wheel.

23. The position release mechanism according to claim 21 further comprising a release control lever that rotates the release wheel.

24. The position release mechanism according to claim 23 wherein the release control lever rotates the release wheel in only one direction.

25. The position release mechanism according to claim 23 wherein the release control lever has a range of motion from a first position to a second position in the position releasing direction, and wherein selected ones of the plurality of release teeth repetitively disengage the position maintaining pawl from its corresponding position maintaining teeth as the release control lever moves from the first position to the second position.

26. The position release mechanism according to claim 25 further comprising a position setting member operatively coupled to the positioning unit for rotating the positioning wheel in a second direction opposite the first biased direction.

27. The position release mechanism according to claim 26 wherein rotation of the positioning wheel in the second direction causes the position maintaining pawl to disengage from a previously engaged position maintaining tooth.

28. The position release mechanism according to claim 27 further comprising a biasing mechanism that biases the positioning unit in the first biased direction.

29. The position release mechanism according to claim 28 wherein the release wheel rotates coaxially relative to the positioning wheel.

30. A position release mechanism for a bicycle control device comprising:
   a positioning unit that is adapted to be biased in a first biased direction;
   a position maintaining mechanism that maintains the positioning unit in a plurality of predetermined positions when the positioning unit is biased in the first biased direction;
   a release member that moves independently of the position maintaining mechanism only in a one-way position releasing direction to move the position maintaining mechanism, wherein the release member is operatively coupled to the position maintaining mechanism so that the positioning unit moves in the first biased direction caused by movement of the release member in the position releasing direction; and
   a release member moving member that moves the release member in only the position releasing direction.

31. A position release mechanism for a bicycle control device comprising:
   a positioning unit that is adapted to be biased in a first biased direction;
   a position maintaining mechanism that maintains the positioning unit in a plurality of predetermined positions corresponding to speed steps of a bicycle transmission when the positioning unit is biased in the first biased direction; and
   a position releasing mechanism that moves in a position releasing direction without directly moving the positioning unit, wherein the position releasing mechanism is operatively coupled to the position maintaining mechanism so that the positioning unit completes at least one movement through at least one of the plurality of predetermined positions in the first biased direction for the same bicycle transmission caused by a progressive movement of the position releasing mechanism in the position releasing direction.

32. A position release mechanism for a bicycle control device comprising:
   a positioning unit that is adapted to be biased in a first biased direction;
   a position maintaining mechanism that maintains the positioning unit in a plurality of predetermined positions when the positioning unit is biased in the first biased direction;
   a position releasing mechanism that moves in a position releasing direction, wherein the position releasing mechanism is operatively coupled to the position maintaining mechanism so that the positioning unit moves through at least two of the plurality of predetermined positions in the first biased direction caused by a progressive movement of the position releasing mechanism in the position releasing direction;
   wherein the position releasing mechanism comprises a release member having a plurality of position releasing abutments;
   wherein the release member comprises a release wheel that rotates relative to the positioning unit; and
   wherein the plurality of position releasing abutments comprise a plurality of release teeth disposed in a circumferential direction on the release wheel.

33. The position release mechanism according to claim 32 wherein the plurality of release teeth are disposed completely around the release wheel.

34. The position release mechanism according to claim 32 wherein the position maintaining mechanism comprises:
   a position maintaining member; and
   a plurality of position maintaining abutments.

35. The position release mechanism according to claim 34 wherein the position maintaining member comprises a position maintaining pawl, wherein the positioning unit comprises a positioning wheel, and wherein the plurality of position maintaining abutments comprise a plurality of position maintaining teeth disposed in a circumferential direction on the positioning wheel.

36. The position release mechanism according to claim 35 wherein the release wheel rotates coaxially relative to the positioning wheel.

37. The position release mechanism according to claim 35 further comprising a release control lever that rotates the release wheel.

38. The position release mechanism according to claim 37 wherein the release control lever rotates the release wheel in only one direction.

39. The position release mechanism according to claim 37 wherein the release control lever has a range of motion from a first position to a second position in the position releasing direction, and wherein selected ones of the plurality of release teeth repetitively disengage the position maintaining pawl from its corresponding position maintaining teeth as the release control lever moves from the first position to the second position.

40. The position release mechanism according to claim 39 further comprising a position setting member operatively coupled to the positioning unit for rotating the positioning wheel in a second direction opposite the first biased direction.

41. The position release mechanism according to claim 40 wherein rotation of the positioning wheel in the second direction causes the position maintaining pawl to disengage from a previously engaged position maintaining tooth.

42. The position release mechanism according to claim 41 further comprising a biasing mechanism that biases the positioning unit in the first biased direction.

43. The position release mechanism according to claim 42 wherein the release wheel rotates coaxially relative to the positioning wheel.

\* \* \* \* \*